United States Patent
May (10) Patent No.: US 6,491,216 B1
(45) Date of Patent: Dec. 10, 2002

(54) SECURITY SYSTEM

(75) Inventor: David C. C. May, Darsie (GB)

(73) Assignee: NCR Corporation, Dayton, OH (US)

( * ) Notice: Subject to any disclaimer, the term of this patent is extended or adjusted under 35 U.S.C. 154(b) by 134 days.

(21) Appl. No.: 09/612,680

(22) Filed: Jul. 10, 2000

(30) Foreign Application Priority Data

Jul. 23, 1999 (GB) ................................. 9917199

(51) Int. Cl.[7] .................. G06F 17/00; G06F 17/60; G06F 13/00
(52) U.S. Cl. ................. 235/375; 235/379; 235/475; 235/485; 235/486
(58) Field of Search ................. 235/379, 475, 235/485, 486, 375; 271/3.13, 3.14, 3.15, 152, 153, 240, 258.01, 259; 705/43, 45

(56) References Cited

U.S. PATENT DOCUMENTS

| | | | |
|---|---|---|---|
| 3,634,656 A | 1/1972 | Krechmer et al. | 235/61.7 |
| 3,909,595 A | 9/1975 | Morello et al. | 235/61.11 |
| 3,979,578 A | 9/1976 | McCullough et al. | 235/61.11 |
| 3,980,167 A | 9/1976 | Tamura et al. | 194/4 |
| 5,136,144 A * | 8/1992 | Swinton et al. | 235/379 |
| 5,483,069 A * | 1/1996 | Kofune et al. | 250/341.1 |
| 5,507,481 A * | 4/1996 | Meyer et al. | 271/189 |

FOREIGN PATENT DOCUMENTS

| | | | |
|---|---|---|---|
| DE | 3930656 | 3/1991 | |
| JP | 04256652 A * | 9/1992 | B65H/11/00 |

* cited by examiner

*Primary Examiner*—Karl D. Frech
*Assistant Examiner*—April A. Nowlin
(74) *Attorney, Agent, or Firm*—Peter H. Priest (57) ABSTRACT

A security system is provided for use in association with a media entry slot (14, 24) on the user interface (12) of a self service terminal (10), such as a automated teller machine (ATM). At least three profile sensors (60a–60e) are arranged to detect the profile of the leading edge of an object (16) inserted into the slot, (14, 24). An access control means allows objects having a leading edge profile corresponding to a predetermined profile only to access a restricted zone such as the card reader module or a depository. This arrangement reduces the risk of fraudulent access to sensitive parts of the self service terminal via the media entry slots provided on its user interface (12).

22 Claims, 4 Drawing Sheets

SECURITY SYSTEM

BACKGROUND OF THE INVENTION

This invention relates to a security system for use in co-operation with a media entry slot on a user interface of a self-service terminal such as an automated teller machine (ATM), the security system being adapted to control access of objects inserted through the media entry slot to a restricted zone within the self-service terminal.

Self-service terminals are becoming increasingly popular, with ATMs now replacing visits to traditional financial institutions for the cash withdrawal and deposit requirements of many customers. However, such machines, especially those designed for a stand alone unattended environment, are susceptible to vandalism and fraud. The user interface of a typical ATM has a card reader slot for the insertion of a user's identification card and frequently is provided with a slot for receiving small deposit packages containing cash or checks during a deposit transaction. These slots, in particular, tend to be targeted by vandals who forcibly insert foreign objects therethrough, often causing the terminal to be taken out of service, or by criminals in an attempt to gain access to the interior of the ATM. It has also been known for criminals to insert fraudulent card reading devices through the card reader slot in an attempt to read the data stored on subsequently inserted user identification cards or to manipulate other undesired objects into the interior of the ATM.

The ATM user interface slots are therefore often protected against the insertion of undesired objects by a shutter mechanism which is opened only on insertion of a card during a customer transaction. Width detection switches (mechanical or optical) are frequently used to activate the shutter when an object of appropriate size, such as a user identification card or a deposit package or envelope, is inserted into the slot. However, such width detection switches have the disadvantage that only the ends of the leading edge of the inserted object are detected and hence the insertion of any object of appropriate width into the slot will cause the shutter to open. This means that the insertion of two screwdrivers or similar tools at either end of the slot may cause the shutter to be activated providing access to the zone behind the shutter.

SUMMARY OF THE INVENTION

It is an object of the present invention to provide a security system which reduces the risk of vandalism and fraud at a self-service terminal and in which the disadvantages associated with the conventionally used width detection switches are alleviated.

According to the present invention there is provided a security system for use in co-operation with a media entry slot on the user interface of a self service terminal, the security system being adapted to control access of objects inserted through the media entry slot to a restricted zone within the self-service terminal and comprising media detection means for detecting the leading edge an object inserted through the media entry slot;

media verification means for determining whether the inserted object is authorized for access to the restricted zone; and access control means for allowing an inserted object which is authorized for access to the restricted zone to pass thereto, characterized in that the media detection means comprises three or more profile sensors arranged so as to detect the profile of the leading edge of the inserted object at three or more discrete positions and in that objects having a leading edge of a predetermined profile only are authorized for access to the restricted zone by the media verification means.

By the use of three or more profile sensors, it is possible to not only detect an object at either end of the slot but also at any other desired location across the aperture, and so ensure that only objects having a leading edge of a predetermined profile corresponding to the relative positions of the profile sensors are allowed to pass to the restricted zone.

Suitably, the media detection means comprises an optical sensor arranged to cooperate with the profile sensors, the optical detector comprising a light transmitter and a light receiver and each profile detector comprising a vane moveable between a first position in which the vane blocks the path of light between the light transmitter and the light receiver and a second position in which the vane is clear of the path of light between the transmitter and the receiver.

Such an arrangement of a single light transmitter and light receiver, with multiple vanes associated therewith, provides a simple mechanism by which the profile sensors provide a signal characteristic of the profile of the leading edge of an object to the media verification means to allow passage of an object to the restricted zone only if all of the vanes are displaced, so indicating insertion of an object having the predetermined profile.

According to another aspect of the invention there is provided a self-service terminal comprising a security system as described.

The invention further provides a method of controlling access to restricted zones within a self-service terminal comprising the steps of receiving an object within a media entry slot on a user interface of the self-service terminal;

detecting the profile of the leading edge of the object and determining whether the detected profile corresponds to a predetermined profile; and allowing passage of an object having a leading edge profile corresponding to the predetermined profile to the restricted zone.

By detecting and determining the profile of the object it is possible to prevent objects which do not correspond to a predetermined profile from passing beyond the aperture.

BRIEF DESCRIPTION OF THE DRAWINGS

An embodiment of the invention will now be described by way of example with reference to the accompanying drawings in which.

DETAILED DESCRIPTION

Figure 1:
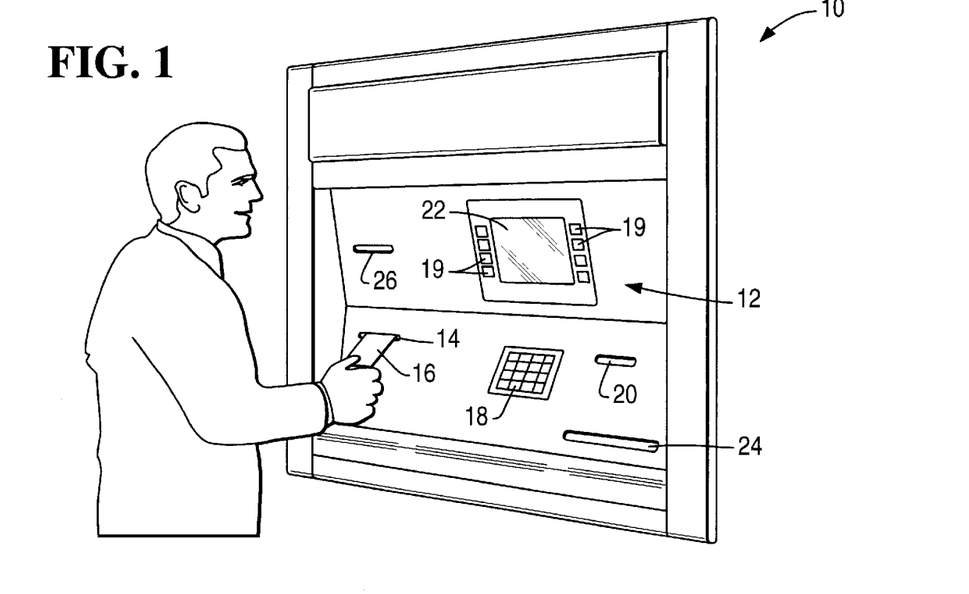
FIG. 1 shows an external perspective view of an automated teller machine (ATM) embodying the present invention.

Referring to FIG. 1, the ATM 10 shown therein comprises a user interface 12 to allow a user to interact with the terminal during a transaction. The user interface 12 includes a card reader slot 14 for insertion of user identification card 16 bearing encoded user data at the commencement of a transaction, a key pad 18 and additional keytips 19 at the side of a display 22 for entering information during a transaction, a cash dispenser slot 20 for delivery of currency notes stored within the ATM 10 to a customer in a cash withdrawal transaction, a display 22 for displaying information to the customer during a transaction, a deposit slot 24 for receiving deposit envelopes containing cash or checks during a deposit transaction, and a receipt printer slot 26 for delivery of a receipt to a customer at the end of a transaction. The card reader, cash dispenser, depository and receipt printer modules associated with the respective slots 14, 20, 24 and 26 in the user interface 12 of the ATM 10 are designated by the same reference numerals in FIG. 2.

Figure 2:
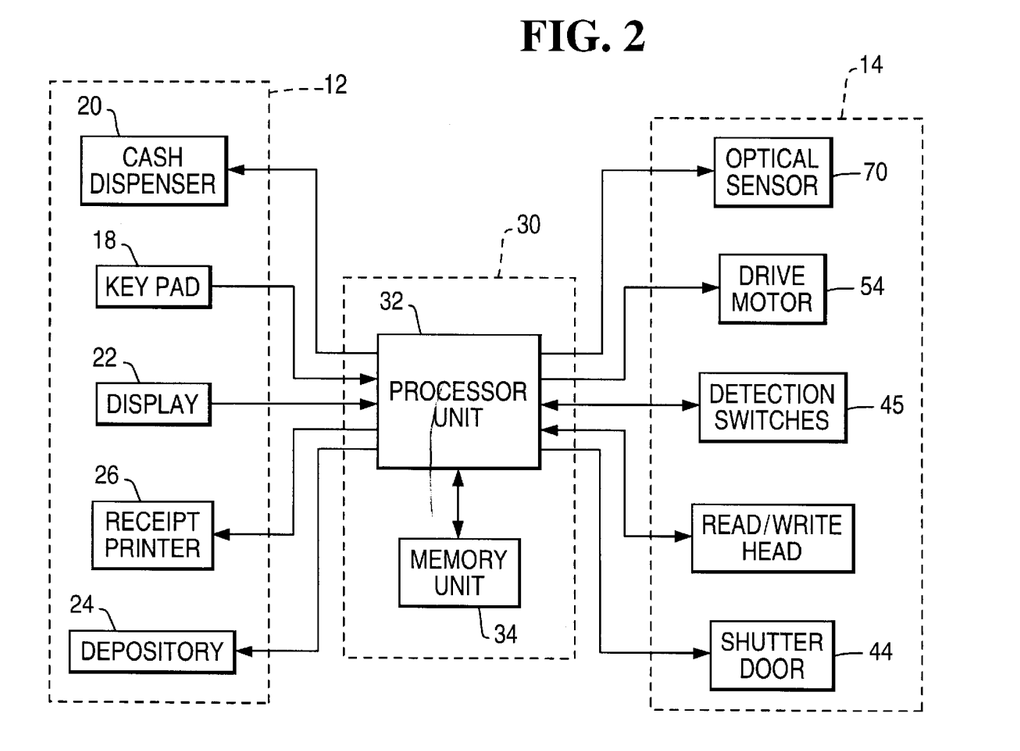
FIG. 2 is a system block diagram representation of the ATM of FIG. 1.

With reference to FIG. 2, the ATM 10 further comprises a controller unit 30 which communicates with components of the user interface 12. The controller unit 30 includes a processor unit 32 and a memory unit 34 connected, via a bus line to the processor unit 32. The processor unit 32 receives signals from the key pad 18 and from various mechanisms of the card reader and depository modules, and provides output signals to the display 22, the receipt printer 26, the cash dispenser module 20 and to various mechanisms of the card reader module 14. It should be understood that the processor unit 32 controls the amount of cash dispensed by the cash dispenser 20, the information displayed on the display 22 and the information printed by the receipt printer 26. The processor unit 32 may include a microcomputer, and the memory unit 34 may be a non-volatile RAM. The structure and operation of such microcomputer and memory are well known and therefore will not be described.

Figure 3A:
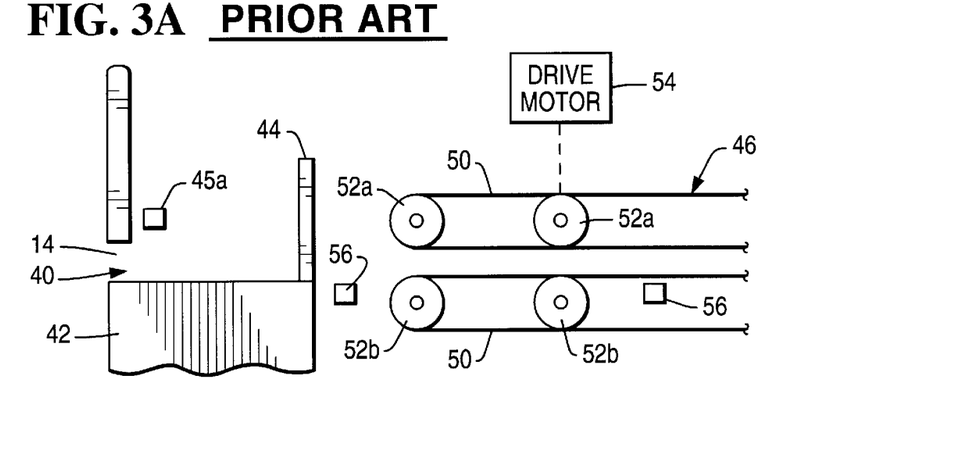
FIG. 3A is a diagrammatic representation of the main operating parts of a portion of the card reader module of the ATM of FIG. 1 incorporating a prior art security system associated with the card reader module, the shutter door of the card reader module being shown in a closed position blocking access to the operating parts behind the shutter door.
Figure 3B:
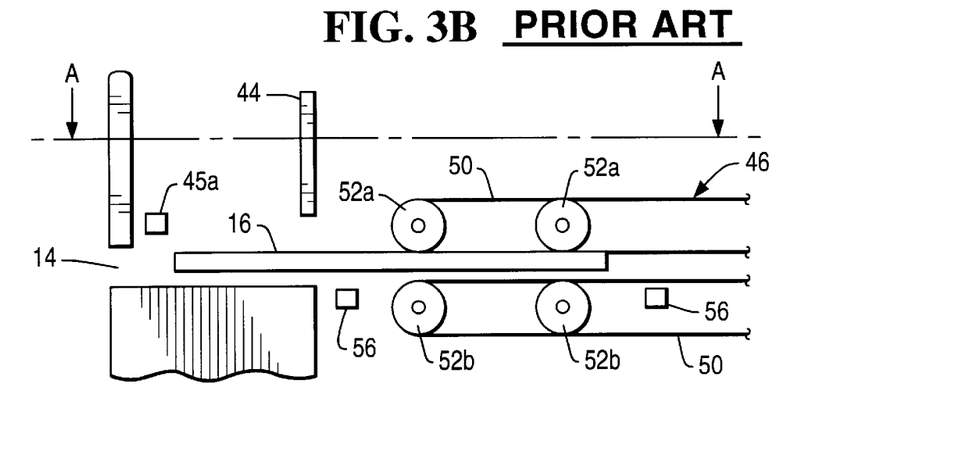
FIG. 3B is a view similar to FIG. 3A except that the shutter door is shown in an open position so as to allow an inserted card to pass toward the read head of the card reader module.
Figure 3C:
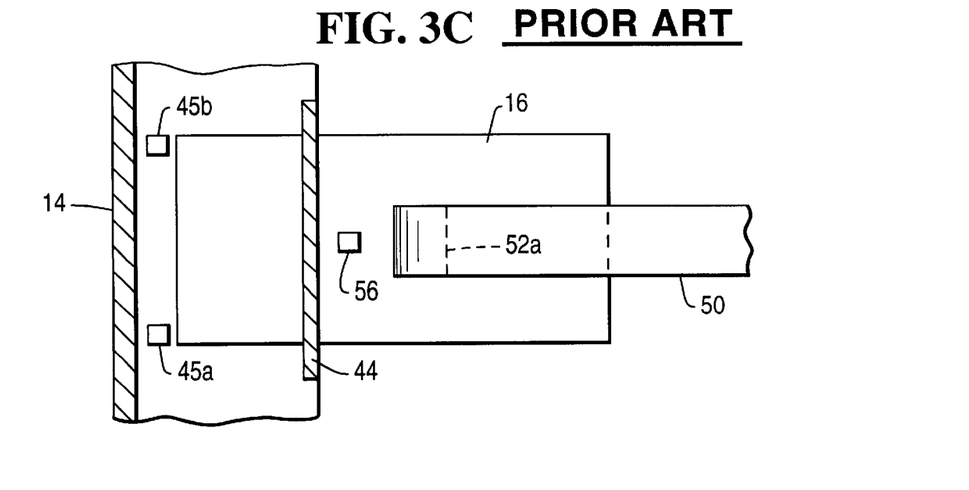
FIG. 3C is a plan view along line A—A of FIG. 3B.

FIGS. 3A to 3C illustrate a prior art security system associated with the card reader module of the ATM 10. A shutter mechanism 40 is located in front of the card reader slot 14 on the user interface 12 and includes a shutter enclosure 42 which is aligned with the card reader slot 14 and a shutter door 44 which is movable between a closed position in which the shutter enclosure 42 is blocked, and an open position in which a user identification card 16 may move through the shutter enclosure 42 towards a card read/write head (not shown) where data encoded on the card can be read. Two detection switches 45a and 45b are provided at either side of the shutter enclosure 42 adjacent the shutter door 44 and are spaced apart by a predetermined distance corresponding to the width of a typical user identification card. It should be understood that the user identification cards suitable for use in association with self service terminals such as an ATM are of universally standard dimensions, as defined in ISO/IEC 7810. A card transport mechanism 46 is provided adjacent the shutter enclosure 42 and serves to move a user identification card 16 which has been inserted past the open shutter door 44 along a feed path to a card read/write head (not shown) where the data encoded on the card is read. The transport mechanism 46 is of conventional design and typically includes an endless belt 50 and a plurality of pairs of rollers, each pair of rollers 52 comprising a roller 52a around which the endless belt 50 passes and an idler roller 52b. One of the rollers is operatively coupled to a drive motor 54 and serves as a drive roller for the endless belt 50.

When a user identification card 16 of standard width is inserted into the card reader slot 14, the leading edge thereof will cause both switches 45a and 45b at either side of the shutter enclosure 42 to be triggered simultaneously and a detection signal to be transmitted to the processor unit 32 (see FIG. 2). On receipt of this signal, the processor unit 32 causes the shutter door 44 to open as shown in FIG. 3B, and the drive motor 54 of the transport mechanism 46 to be activated. The customer can then insert the user identification card 16 further into the card reader module 14 until the leading edge thereof engages the outer circumferential surface of the endless belt 50 of the transport mechanism 46 to be carried forward along the feed path toward the read/write head. Further detection switches 56 or photosensors may be provided along the feed path to signal the passage of the leading edge of the card 16, so as to control further card processing functions and/or to cause shutter door 44 to be closed, blocking the shutter enclosure 42 so that foreign objects cannot be inserted into the card reader module 14 while the transaction is being processed.

Figure 4A:
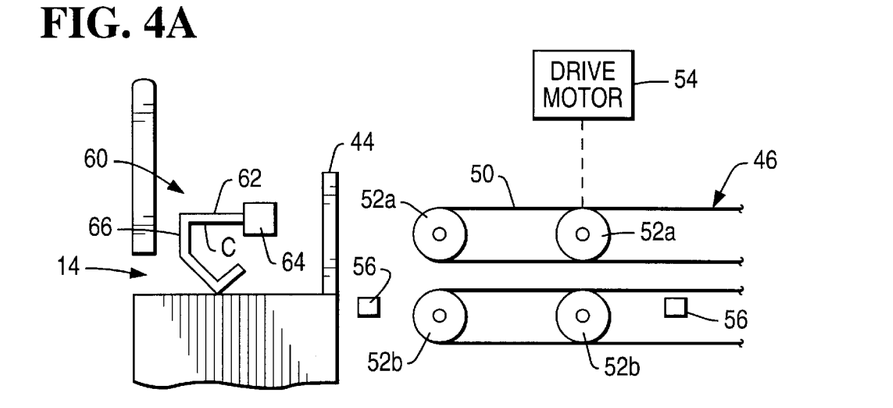
FIG. 4A is a diagrammatic representation of the main operating parts of a portion of the card reader module of FIG. 1, incorporating an embodiment of the security system of the present invention, the shutter door of the card reader module being shown in a closed position blocking access to the operating parts behind the shutter door.
Figure 4B:
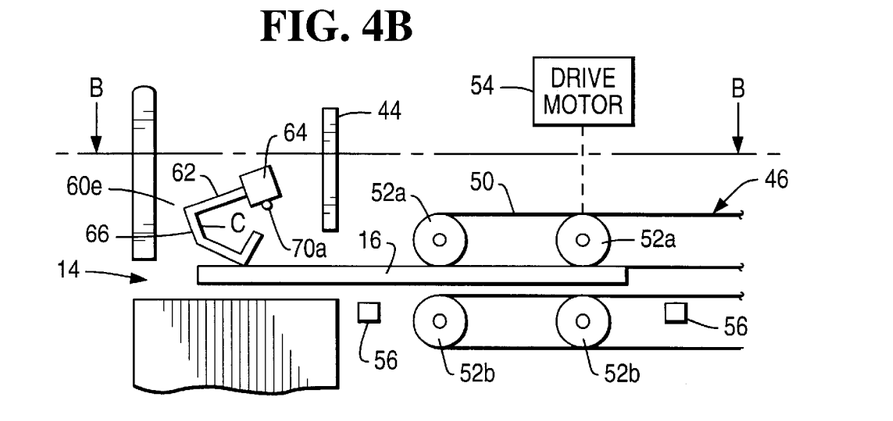
FIG. 4B is a view similar to FIG. 4A except that the shutter door is shown in an open position so as to allow an inserted card to pass toward the read head of the card reader module.
Figure 4C:
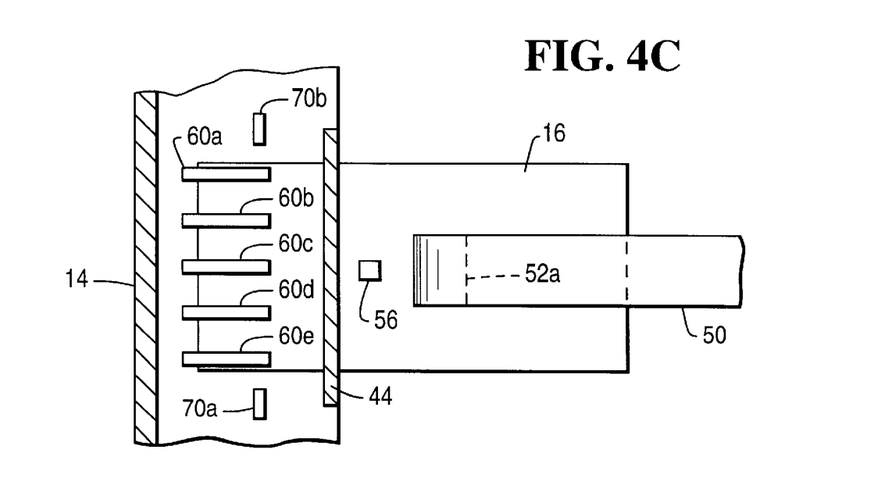
FIG. 4C is a plan view along line B—B of FIG. 4B.

The security system of the present invention will now be described with reference to FIGS. 4A to 4C. As can be seen from FIG. 4C, a series of five parallel profile sensors 60a–e are arranged so as to extend across the width of shutter enclosure 42, behind the card reader slot 14 and adjacent the shutter door 44. Each sensor 60 comprises a lever arm 62 having a vane 64 arranged at one end thereof and a switch pin 66 at the other end thereof extending perpendicularly from the arm 62 in the same plane as the vane 64 (see FIGS. 4A and 4B). The lever arm 62 is mounted above the level of the horizontal card reader slot 14 with the switch pin 66 extending downwards. The lever arm 62 is mounted for pivotal movement about a point C between and in the plane of the vane 64 and the switch pin 66, such that the sensor 60 can rock. When no card is present in the shutter enclosure 42, the switch pin 66 is biased by gravity or other means to a first position in which it extends into the path of travel of a card through the shutter enclosure 42. The free end of the switch pin 66 is shaped to form an oblique angle with respect to the path of travel of a card through the shutter enclosure 42, in such a way that when a card moves through the shutter enclosure 42, the leading edge thereof will push the lower edge of the switch pin 66, so rocking the sensor 60 to a second position in which the lower edge of the switch pin 66 is raised slightly above the path of travel of the card 16.

An optical sensor 70 (not visible in FIG. 4A) is positioned in the shutter enclosure and is arranged to co-operate with the vanes 64 of the profile sensors 60a–e. The optical sensor 70 includes a transmitter 70a (FIGS. 4B and 4C) and a receiver 70b (FIG. 4C) which are disposed in parallel spaced apart relation to each other on opposite sides of the shutter enclosure 42 adjacent the vanes 64 of the end most profile sensors 60a and 60e. When the switch pins 66 of each profile sensor 60 are in the first position (i.e. when no card is present in the shutter enclosure 42), their respective vanes are positioned so that they block the light transmitted by the transmitter 70a of the optical sensor.

Upon insertion of a standard user identification card 16 through the card reader slot 14 into the shutter enclosure 42, the leading edge of the card 16 simultaneously comes into contact with the lower edges of each of the switch pins 66 causing the profile sensors 60a to 60e to rock about point C and the pins to be displaced in an upward direction. As the switch pins 66a to 66e of each profile sensor 60a to 60e move, the corresponding lever arms 62 pivot in an anti-clockwise direction (with reference to FIGS. 4A and 4B) causing their respective vanes 64 to move out of the light pathway between the transmitter 70a and the receiver 70b, such that light from the transmitter 70a is detected by the receiver 70b. On detection of the light from the transmitter 70a, a detection signal is transmitted to the processor unit 32 by the receiver 70b. On receipt of this signal, the processor unit 32 causes the shutter door 44 to open as shown in FIG. 4B, and the drive motor 54 of the transport mechanism 46 to be activated. The customer can then insert the user identification card 16 further into the card reader module 14 until the card engages with the belt 50 and is carried forward toward the read/write head as described earlier with reference to FIG. 3.

It should be understood that only if all of the individual switch pins 66 are displaced by the leading edge of a card as it passes through the shutter passage 42 so as to cause pivotal movement of the associated lever arms 62 and vanes 64, will the light from the transmitter be detected by the receiver. Hence, if an object of width less than that of a standard user identification card or a card having an incorrect profile form is inserted through the card reader slot 14 into the shutter passage 42, some of the switch pins will not be displaced and their associated vanes will continue to prevent light from the transmitter reaching the receiver. If two objects such as screw drivers are inserted into the card reader slot at either side, the switch pins extending into the center of the shutter passage will fail to be displaced and again no light will be detected by the receiver. In both these instances, the shutter door 44 will remain closed preventing access to the operating mechanisms of the card reader module therebehind.

Figure 5:
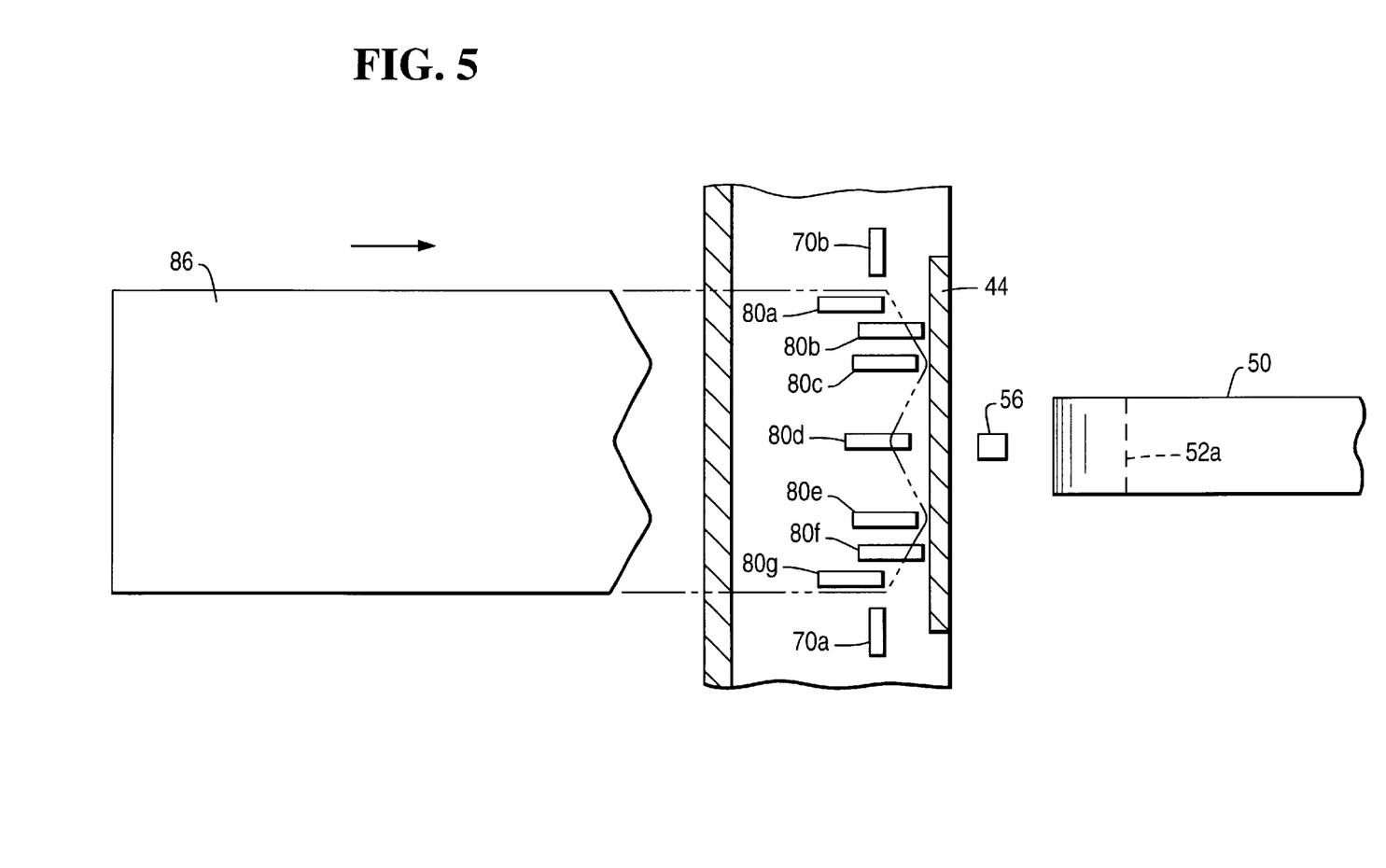
FIG. 5 is a view similar to that of FIGS. 3C and 4C and illustrates a second embodiment of the invention suitable for use with a card having a leading edge of irregular profile.

In the embodiment shown in FIG. 5, seven profile sensors 80a–g are arranged across the width of the shutter enclosure at different longitudinal positions in the direction of card travel through the shutter enclosure as will be explained below. The arrangement of profile sensors is designed to allow only a card having a leading edge of a predetermined profile as borne by card 86 to open the shutter 44. Four of the seven profile sensors 80a, c, e and g are as described above with reference to FIG. 4 having vanes appropriately positioned to block the light pathway between the transmitter and the receiver of the optical sensor (not shown in FIG. 5) when in an undisplaced position. These four profile sensors are arranged along a similar pattern to the profile of the leading edge of the card 86 at a position whereby the switch pins of these sensors will be displaced by the leading edge of the card 86 when inserted up to the shutter 44. The other profile sensors 80b, d and f are designed such that their vanes only block the light pathway between the transmitter and the receiver of the optical sensor when displaced. These three profile sensors are arranged at positions slightly closer to the shutter than would enable the switch pins of these sensors to be displaced by the leading edge of the card 86 when inserted up to the shutter 44. The different positions of the two sets of profile sensors can be seen relative to the profile of the leading edge of the card 86 as inserted up to the shutter 44 and shown in dotted outline in FIG. 5.

Upon insertion of card 86 through the card reader slot 14, the leading edge of the card comes into contact with the lower edges of the switch pins of profile sensors 80a, c, e and g and displaces these optical sensors and their respective vanes as the card is pushed against the shutter 44. The other profile sensors 80b, d, and f and their respective vanes remain undisplaced due to their positions as discussed above. Thus, at the point when the card 86 is pushed against the shutter 44, none of the vanes of the profile sensors is blocking the light pathway between the transmitter and the receiver of the optical sensor, and a light detection signal is transmitted to the processor unit 32 by the receiver. On receipt of this signal, the processor unit causes the shutter door 44 to open and the drive motor of the transport mechanism to be activated. The customer can then insert the user identification card 86 further into the card reader module until the card engages with the belt 50 and is carried forward toward the read/write head.

Should a card having a leading edge of a different profile be inserted through the card reader slot, unless the profile is such that only the profile sensors 80a, c, e and g are displaced, then the light pathway between the transmitter and the receiver of the optical sensor will remain blocked by one or more of the vanes, and the shutter door 44 will remain closed. For example, if a standard rectangular card having a leading edge with a straight profile is inserted through the card reader slot, by the time the card reaches the shutter door 44, all of the profile sensors will be displaced. Thus, although the vanes of the profile sensors 80a, c, e and g will have moved out of the light pathway between the transmitter and the receiver of the optical sensor, the vanes of the profile sensors 80b, d and f will have moved into the light pathway, so preventing transmission of a light detection signal from the receiver of the optical sensor, and the shutter will remain closed.

Although security systems using series of five and seven profile sensors have been described for the purposes of these examples, it will be appreciated that as few as three detection sensors may advantageously be used in accordance with the invention, though clearly the greater the number of detection sensors, the greater the accuracy of the security system means in detecting the card profile, and hence the greater the security. Also, the greater the number of detection sensors, the less space there will be between sensors to allow fraudulent manipulation of objects within the machine.

Furthermore, although the security systems described comprise both a shutter 40 and a transport mechanism 46, which serve to allow an object authorized for access to the card reader module to pass thereto, it should be understood that either a shutter 40 or a transport mechanism 46 alone, or in conjunction with any other access control means may be used.

Moreover, although the embodiments of the security system of the present invention described are used in co-operation with the card reader slot of a self service terminal, it should be understood that the security system may be used with any other media entry slot. For example, the security system may be used in co-operation with the deposit slot 24 on the user interface 12 of the ATM. Such a deposit slot 24 is typically arranged to receive small deposit packages such as envelopes containing cash and/or checks and has a shutter mechanism which provides access to a deposit receptacle within the terminal in which the deposited envelopes are stored temporarily. For obvious reasons, it is important that the receptacle cannot be accessed via the deposit slot in the user interface 12 except to allow a genuine deposit envelope to pass thereto during a deposit transaction at the ATM 10. Hence, the security system of the present invention arranged to detect the profile of standard deposit envelopes before activating the shutter mechanism would serve to minimize the risk of fraudulent access to the deposit receptacle.

It will be understood that the present disclosure is for the purpose of illustration only, and the invention extends to modifications, variations and improvements thereto. For example, it will be appreciated that the construction of the profile sensors may be varied, and other types of profile sensors (e.g. mechanical) may be used in accordance with the invention. Furthermore, the security system described herein could be modified for use with any self-service terminal designed for the insertion of media, whether the media be cards or any other objects.

What is claimed is:

1. Security system for use in cooperation with a media entry slot on a user interface of a self service terminal to control access of objects inserted through the media entry slot to a restricted zone within the self-service terminal, said objects having a predetermined profile defined by the positional relationship of at least three discrete points located thereon, the security system comprising:

media detection means for detecting whether the leading edge of an inserted object through the media entry slot has the predetermined profile; and access control means responsive to the media detection means for allowing the inserted object detected as having the predetermined profile to pass to the restricted zone;

the media detection means comprising three or more profile sensors spaced across a path of travel and located adjacent the media entry slot, said sensors cooperating together to detect the profile of the leading edge of the inserted object at three or more positionally related discrete points on the object such that only objects having a leading edge of the predetermined profile are authorized for access to the restricted zone.

2. The security system according to claim 1, wherein the media detection means comprises signal generation means for transmitting a signal to the media verification means upon detection of an inserted object having a leading edge of a predetermined profile.

3. Security system for use in co-operation with a media entry slot on a user interface of a self service terminal to control access of objects inserted through the media entry slot to a restricted zone within the self-service terminal, the security system comprising:

media detection means for detecting the leading edge of an object inserted through the media entry slot, the media detection means comprising three or more profile sensors for detecting the profile of the leading edge of the inserted object at three or more discrete positions such that objects having a leading edge of a predetermined profile only are authorized for access to the restricted zone by a media verification means;

the media verification means for determining whether the detected object is authorized for access to the restricted zone, the media detection means further comprising a signal generation means for transmitting a signal to the media verification means upon detection of the inserted object and an optical sensor for cooperating with the profile sensors, the optical sensor including a light transmitter and a light receiver and each profile sensor including a vane moveable between a first position in which the vane blocks the path of light between the light transmitter and the light receiver and a second position in which the vane is clear of the path of light between the light transmitter and the light receiver and;

access control means for allowing an inserted object which is authorized for access to the restricted zone to pass thereto.

4. The security system according to claim 3, wherein the vanes are displaced from the first position to the second position upon insertion of an object having a leading edge of a predetermined profile.

5. The security system according to claim 3, wherein the media entry slot on the user interface of the self-service terminal is a card reader slot, and the restricted zone comprises a card reader module of the self service terminal.

6. The security system according to claim 3, wherein the media entry slot on the user interface of the self-service terminal is a deposit slot, and the restricted zone comprises a depository module of the self-service terminal.

7. The security system according to claim 3, wherein the access control means comprises a transport mechanism.

8. The security system according to claim 3, wherein the access control means comprises a shutter mechanism.

9. A self-service terminal comprising:

a user interface;

means defining a media entry slot on the user interface;

means defining a restricted zone within the self-service terminal;

media detection means for detecting the leading edge of an object inserted through the media entry slot;

media verification means for determining whether the detected object is authorized for access to the restricted zone; and access control means for allowing an inserted object which is authorized for access to the restricted zone to pass thereto;

the media detection means comprising three or more profile sensors spaced across a path of travel and located adjacent the media entry slot, said sensors cooperating together to detect the profile of the leading edge of the inserted object at three or more positionally related discrete points on the object such that only objects having a leading edge of a predetermined profile defined by the positional relationship of three or more discrete points are authorized for access to the restricted zone by the media verification means.

10. The self-service terminal according to claim 9, wherein the media detection means comprises signal generation means for transmitting a signal to the media verification means upon detection of an inserted object having a leading edge of a predetermined profile.

11. A self-service terminal comprising:

a user interface;

means defining a media entry slot on the user interface;

means defining a restricted zone within the self-service terminal;

media detection means for detecting the leading edge of an object inserted through the media entry slot, the media detection means comprising three or more profile sensors for detecting the profile of the leading edge of the inserted object at three or more discrete positions such that objects having a leading edge of a predetermined profile only are authorized for access to the restricted zone by a media verification means, the media detection means further comprising an optical sensor for cooperating with the profile sensors, the optical sensor including a light transmitter and a light receiver and each profile sensor including a vane moveable between a fist position in which the vane blocks the path of light between the light transmitter and the light receiver and a second position in which the vane is clear of the path of light between the light transmitter and the light receiver;

the media verification means for determining whether the detected object is authorized for access to the restricted zone, the media detection further comprising signal generation means for transmitting a signal to the media verification means upon detection of an inserted object having a leading edge of a predetermined profile; and access control means for allowing an inserted object which is authorized for access to the restricted zone to pass thereto.

12. The self-service terminal according to claim 11, wherein the vanes are displaced from the first position to the second position upon insertion of an object having a leading edge of a predetermined profile.

13. The self-service terminal according to claim 11, wherein the media entry slot on the user interface is a card reader slot, and the restricted zone comprises a card reader module of the self service terminal.

14. The self-service terminal according to claim 11, wherein the media entry slot on the user interface is a deposit slot, and the restricted zone comprises a depository module of the self-service terminal.

15. The self-service terminal according to claim 11, wherein the access control means comprises a transport mechanism.

16. The self-service terminal according to claim 11, wherein the access control means comprises a shutter mechanism.

17. A method of controlling access to a restricted zone within a self-service terminal comprising the steps of:

receiving an object within a media entry slot on a user interface of the self-service terminal;

detecting the profile of the leading edge of the object, said detection using three or more profile sensors cooperating with each other to detect the presence of three or more discrete positions on the leading edge;

determining whether the detected profile corresponds to a predetermined profile defined by three or more points in a plane; and allowing passage of an object having a leading edge profile corresponding to the predetermined profile to the restricted zone.

18. A method of operating a self-service terminal, the method comprising:

detecting a profile of a leading edge of an object received within a media entry slot on a user interface of the self-service terminal, said detection using three or more profile sensors cooperating with each other to detect the presence of three or more discrete positions on the leading edge;

determining whether the detected profile corresponds to a predetermined profile defined by three or more points in a plane; and allowing passage of the object to a restricted zone within the self-service terminal when the detected profile corresponds to the predetermined profile.

19. A security system for restricting access to a self service terminal to ensure access by only an object having a predetermined profile, the security system comprising:

a shutter enclosure defining a path of travel from a media entry slot to a shutter which controllably allows entry of objects to a restricted area within the self service terminal;

a media detector having a plurality of three or more profile sensors located between the media entry slot and the shutter in a spaced arrangement across the path of travel to define a predetermined profile, the sensors cooperating with each other to detect at least three discrete points of the leading edge of an inserted object within the shutter enclosure; and a controller in response to the media detector determines whether the profile of the leading edge of the inserted object matches the predetermined profile; upon a successful match the controller authorizes access by controlling the opening of the shutter.

20. The security system as in claim 19 further comprising:

an optical detector having a transmitter and a receiver disposed on opposite sides within the shutter enclosure and located between the media entry slot and the shutter, wherein each profile sensor comprises a lever arm, said arm having a vane at one end and a switch pin at the other end, the vane movable between a first position in which the vane blocks the path of light between the transmitter and the receiver of the optical detector and a second position in which the vane is clear of the path of light between the transmitter and the receiver, wherein when all the sensors are displaced by an object matching a predetermined profile, the optical detector signals the controlling means to open the shutter door for allowing the object access to the restricted area.

21. A security system as in claim 20 wherein the predetermined profile includes a specified width of the object having a straight leading edge and;

the plurality of three or more profile sensors are arranged in a line with respect to each other to detect at least three discrete points of a leading edge of an inserted object, said controlling means shall signal the shutter door to open when the object displaces all the switch pins simultaneously.

22. A security system as in claim 20 wherein the predetermined profile includes a predetermined width of the object having a leading jagged edge and the plurality of three or more profile sensors includes at least one plurality of first profile sensors and at least one plurality of second profile sensors, said first profile sensors arranged similar to the object having the predetermined profile, said first profile sensors are in said first position when undisplaced and said second position when displaced, said second profile sensors arranged at positions slightly closer to the shutter that would enable the switch pins of said second profile sensors to be displaced by the leading edge of an object not having the predetermined profile when inserted against the shutter door, said second profile sensors are in the second position when undisplaced and in the first position when displaced, such arrangement of the profile sensors allow for a clear path of light between the transmitter and receiver when the object is pushed against the shutter door.

* * * * *

UNITED STATES PATENT AND TRADEMARK OFFICE
CERTIFICATE OF CORRECTION

| | | |
|---|---|---|
| PATENT NO. | : 6,491,216 B1 | Page 1 of 1 |
| DATED | : December 10, 2002 | |
| INVENTOR(S) | : May, D. C. C. | |

It is certified that error appears in the above-identified patent and that said Letters Patent is hereby corrected as shown below:

<u>Column 10,</u>
Line 36, delete "A" and insert -- The --, and after "claim" delete "20" and insert -- 19 --.

Signed and Sealed this

Twelfth Day of August, 2003

JAMES E. ROGAN
*Director of the United States Patent and Trademark Office*